Feb. 7, 1967   P. D. JONES ETAL   3,303,389
OVERLOAD PROTECTION CIRCUIT
Filed Jan. 24, 1963

3,303,389
OVERLOAD PROTECTION CIRCUIT
Peter David Jones and Maurice James Wright, Birmingham, England, assignors to Joseph Lucas (Industries) Limited, Birmingham, England
Filed Jan. 24, 1963, Ser. No. 253,729
Claims priority, application Great Britain, Feb. 5, 1962, 4,271/62
1 Claim. (Cl. 317—33)

The object of this invention is to provide a D.C. overload protection circuit in a convenient form.

The present invention makes use of a device known as a controlled rectifier, the characteristic of which is that if a triggering pulse is applied between its gate and cathode terminals the rectifier becomes conductive, and thereafter continues to conduct, even when the triggering pulse is removed, until the anode-cathode current falls practically to zero. Furthermore, it has recently been discovered that conrolled rectifiers manufactured in a certain manner have the additional property that they can be switched off by a pulse of opposite polarity (but not necessarily of equal magnitude) applied between the gate and cathode. Throughout this specification the term "switchable rectifier" is used to mean a controlled rectifier having this additional property, a convenient method of manufacturing a switchable rectifier being described in pending application No. 211,674, filed July 23, 1962.

A D.C. overload protection circuit according to the invention comprises first and second terminals for connection to a D.C. source so as to be of positive and negative polarity respectively, a switchable rectifier having its anode connected to the first terminal and its cathode connected to the second terminal through a resistor, means for applying triggering pulses to the gate of the switchable rectifier to render its conductive, and a device arranged to break down when the voltage across it exceeds a predetermined value, said device being connected between the second terminal and the gate of the switchable rectifier, and the arrangement being such that when the voltage across said resistor exceeds a predetermined value the device will break down and the switchable rectifier will be switched off.

Figure 2:
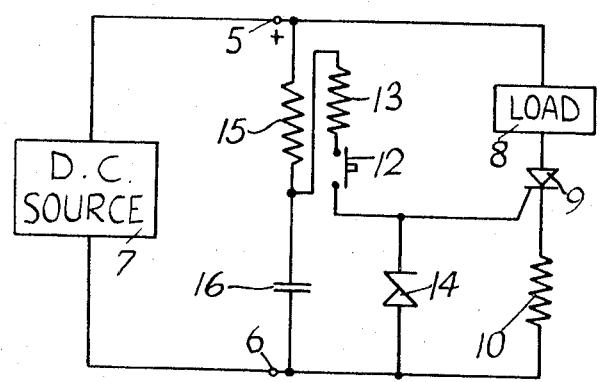
Figure 1:
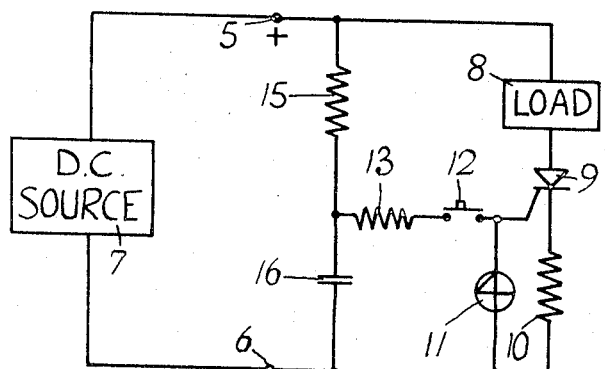

In the accompanying drawings, FIGURES 1 and 2 respectively are circuit diagrams illustrating two examples of the invention.

Referring to FIGURE 1, there are provided terminals 5, 6 for connection to a D.C. source 7 so as to be of positive and negative polarity respectively. The terminal 5 is connected through a load 8 to the anode of a switchable rectifier 9, the cathode of which is connected to the terminal 6 through a resistor 10. The gate of the switchable rectifier is connected to the terminal 6 through a four-layer diode 11, and is further connected through a normally open switch 12 and a resistor 13 in series to a point intermediate a resistor 15 and a capacitor 16 connected in series between the terminals 5, 6.

In use, the capacitor 16 charges through the resistor 15. On closing the switch 12 momentarily, the capacitor 16 discharges through the resistor 13, switch 12, the gate and cathode of the rectifier 9 and the resistor 10 to switch on the receifier 9. Current now flows in the load 8 and 10, and in the event of the current exceeding a predetermined value the voltage developed across the resistor 10 is sufficient to break down the four-layer diode 11, so that the switchable rectifier is switched off by virtue of the correction between its gate and the terminal 6.

When the capacitor has discharged and the switch 12 is open again, the capacitor 16 charges through the resistor 15, which limits the charging rate to a value such that the rectifier 9 is not switched on and off too rapidly in the event of the switch 12 being closed when an overload is present.

The example shown in FIGURE 2 is similar to that shown in FIGURE 1, except that the four layer diode 11 is replaced by a Zener diode 14.

Having thus described our invention what we claim as new and desire to secure by Letters Patent is:

A D.C. overload protection circuit comprising in combination a D.C. source, first and second terminals connected to the D.C. source so as to be of positive and negative polarity respectively, a switchable rectifier having its anode connected to the first terminal, a first resistor through which the cathode of the switchable rectifier is connected to the second terminal, a device adapted to break down when the voltage across it exceeds a predetermined value. said device being connected between the gate of the switchable rectifier and the second terminal, a normally open switch connected in series with second and third resistors between the gate of the switchable rectifier and the first terminal, and a capacitor connected between the second terminal and a point intermediate the second and third resistors, closing of said switch causing switching on of the switchable rectifier, said device breaking down when the voltage across the first resistor exceeds a predetermined value to cause switching off of the switchable rectifier, and said capacitor preventing over-rapid switching on and off of the switchable rectifier.

References Cited by the Examiner
UNITED STATES PATENTS 3,206,696   9/1965   Wright _____ 307—88.5 X
3,210,605   10/1965  Jones _____ 317—33

MILTON O. HIRSHFIELD, Primary Examiner.

J. D. TRAMMELL, Assistant Examiner.